(No Model.)
J. W. CALLARD.
FILTER.
No. 281,177. Patented July 10, 1883.
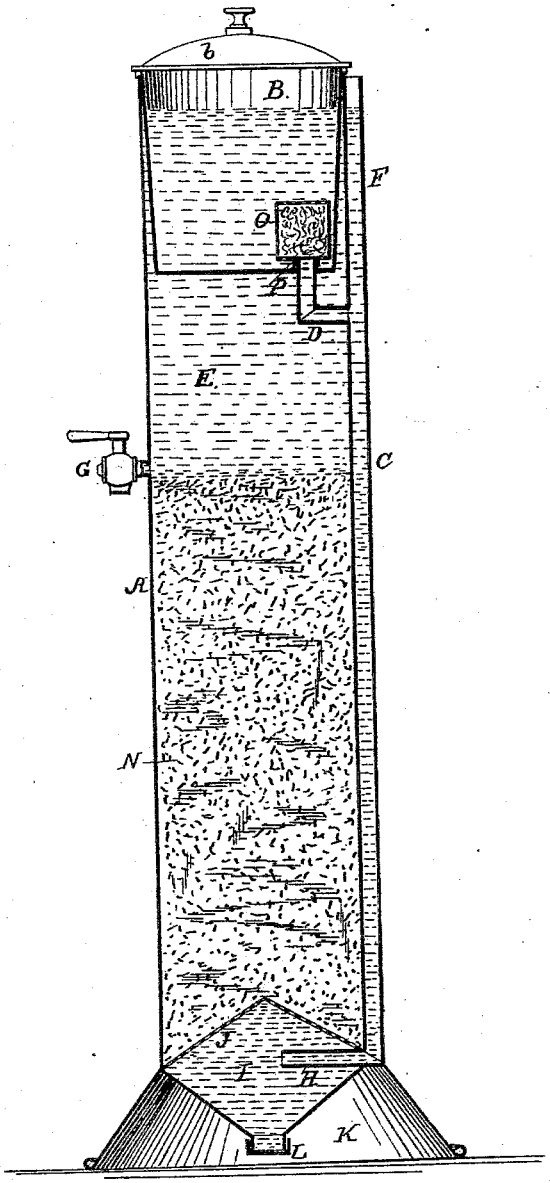
Attest:
R. K. Evans
Inventor:
John W. Callard
G. B. Brock
Atty.

UNITED STATES PATENT OFFICE.

JOHN W. CALLARD, OF TOLEDO, OHIO.

FILTER.

SPECIFICATION forming part of Letters Patent No. 281,177, dated July 10, 1883.

Application filed January 18, 1883. (No model.)

*To all whom it may concern:*

Be it known that I, JOHN W. CALLARD, a citizen of the United States, residing at Toledo, in the county of Lucas and State of Ohio, have invented certain new and useful Improvements in Water-Filters, of which the following is a specification, reference being had therein to the accompanying drawing.

My invention relates to water-filters in which the flow of water is upward through the filtering material, the object of which is to admit of the ready cleansing of the filtering media, when desired, by an opposite or downward flow of water.

The invention consists of a preferably upright casing containing the impure-water chamber, a pure-water chamber arranged below, and a filtering media disposed below the pure-water chamber and above a sediment-receptacle, the whole being connected with a pipe leading from a sponge-chamber in the impure-water receptacle to and through the sediment-chamber, said pipe being provided with an air-pipe.

The combinations held to be new will be hereinafter pointed out in the claims.

To enable those skilled in the art to make my invention, I will now proceed to describe it in detail.

The drawing represents a central longitudinal section of a filter to which I have applied my improvements.

A is the casing, preferably cylindrical in form.

B represents a detachable impure-water chamber, having a cover, *b*. This chamber B is provided with a filtering-box, O, having a removable connection, P, with either the branch D of the influent pipe C or with the bottom of chamber B. The removable connection admits of the chamber O—which is generally filled with sponge—being easily removed for repair or cleansing. The branch D of pipe C allows the water to descend through the latter pipe. Above pipe D the pipe C is extended upward into a pipe, F, communicating with the outer air for the purpose of insuring a steady flow through the influent pipe. This pipe C terminates in a pipe, H, opening into a sediment-chamber, I. I prefer to make receptacle I of the form shown in the drawing, and provided with a removable cap, L. The upper boundary consists of a perforated conical diaphragm, J, which allows the passage of water each way, but prevents the falling down of any of the filtering media N, above which, and at the bottom of the pure-water chamber E, is arranged the eduction-cock G. The filtering media N may be any carbonaceous material; or, if desired, other known matter suitable for the purpose may be used.

In operation the flow of water from chamber B is through sponge-chamber O and pipes D C H to sediment-chamber, where any heavy foreign matter which may have passed through the pipes may be precipitated, and upward through the filtering material N to the pure-water chamber, to be drawn off as required. By removing cap L and creating a counter current through the casing A, the material N may be cleansed.

A base, K, supports the device.

Having described my invention, what I claim as new, and desire to secure by Letters Patent of the United States, is—

1. In water-filters, the combination, with the outer casing having the filtering media located in the lower portion of the casing, the impure-water chamber arranged within the top of the casing, and the removable perforated filtering-chamber within the impure-water chamber, of a pipe connecting the perforated filtering-chamber with the bottom of the outer casing below the filtering media, substantially as described.

2. The combination of casing A and sediment-chamber I, having removable cap L, with impure-water chamber B, having chamber O, and the pipe connecting chambers I and B, substantially as set forth.

3. The combination of casing A and impure-water chamber B, having the removable perforated chamber O arranged therein, with a pipe connecting the latter with the casing A below the filtering material N, said pipe being provided with a branch air-pipe, as described.

In testimony whereof I affix my signature in presence of two witnesses.

JOHN W. CALLARD.

Witnesses:
CHARLES T. POPE,
WILLIAM H. TUCKER.